Sept. 5, 1944.  F. C. HASSE ET AL  2,357,402
WELDING APPARATUS
Original Filed March 1, 1940
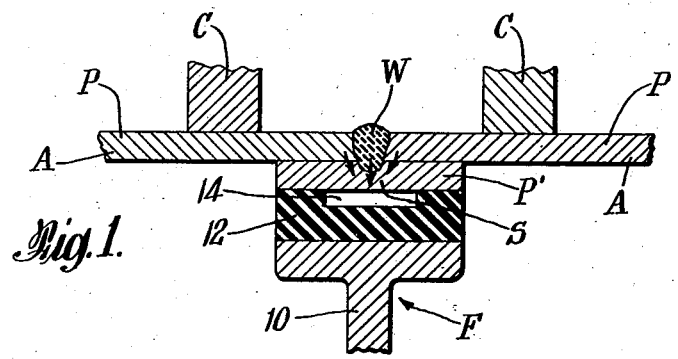
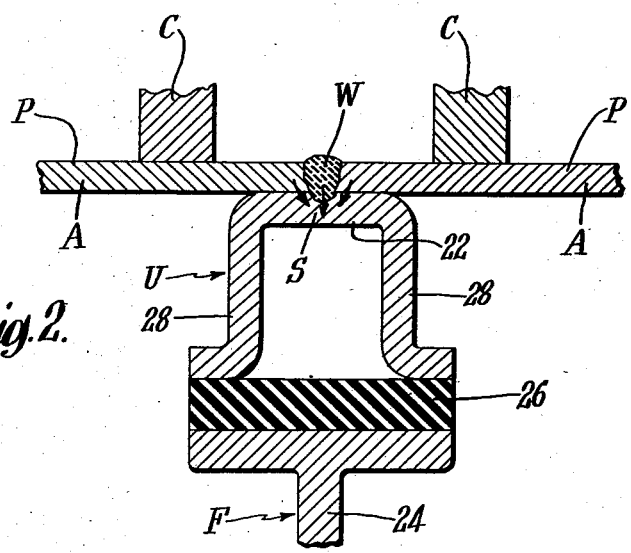
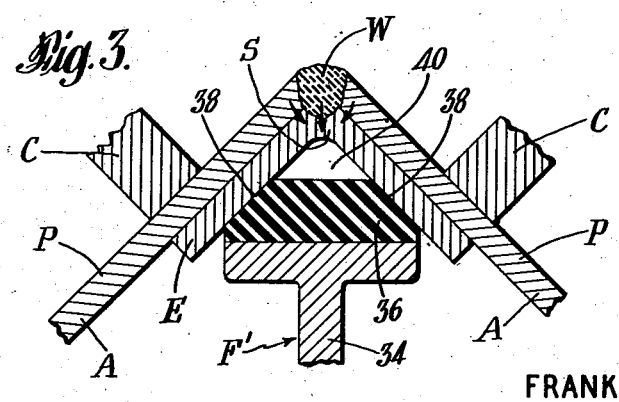
INVENTORS
FRANKLIN C. HASSE
ARTHUR A. BERNARD
BY
ATTORNEY Patented Sept. 5, 1944

2,357,402

UNITED STATES PATENT OFFICE 2,357,402

WELDING APPARATUS

Franklin C. Hasse and Arthur A. Bernard, Chicago, Ill., assignors to The Linde Air Products Company, a corporation of Ohio Original application March 1, 1940, Serial No. 321,620. Divided and this application November 8, 1941, Serial No. 418,310

6 Claims. (Cl. 113—98)

This invention relates to welding apparatus, and more particularly to apparatus for controlling the temperature gradient and heat distribution in locally heated metal members.

While the principles of the invention are equally applicable to various types of operations involving the local application of heat to metal members, the invention, for the purpose of illustration, will be described in some detail as applied to the weld uniting of metal sheets and plates of large area such as those now used extensively in the fabrication of light-weight railway rolling stock.

Welding operations necessitate the local application of a concentrated source of high temperature heat, the amount of heat applied and the temperature locally attained depending upon the type of weld to be made. Thus, the temperature at the heated area may be only sufficient to render the meeting surfaces of the members semi-plastic, as in forge welding, or sufficient to melt the meeting surfaces thoroughly, as in full fusion welding. Although, in welding operations the heat is usually applied only to, or adjacent to, the surfaces to be united, metal adjacent to and remote from the heated surfaces is also heated by conduction from the directly heated surfaces. Such heating, being uneven, tends to warp and distort the welded article.

The problem of shrinking and warping is particularly important in the fabrication of welded structures from large sheets and plates, such as those which are now used in the construction of railway box cars, gondola cars, and other rolling stock. As the metal sheets and plates used in this particular field are relatively thin, they are peculiarly susceptible to warping during welding, as the small mass of metal is not strong enough to be resistant to stresses developed by the expansion and contraction incidental to the localized application of heat to the metal plate.

As the grain size is influenced by the time interval during which the temperature is maintained in or above the critical range, it is desirable to cool the metal rapidly to below the critical range, as soon as possible after it has been deposited.

Also of importance are the effects resulting from the localized heating of such plates when they are made from austinitic-type chromium-nickel stainless steel. When stainless steel of this type is heated between 800° F. and 1600° F., intergranular precipitation of carbides may occur, the extent of the precipitation being a function of the time interval during which the steel is held at temperatures which cause the precipitation. Under those conditions which produce carbide precipitation, the steel loses some of its resistance to corrosion, and at the higher temperatures within the range it loses some of its toughness. The extent of precipitation can be greatly lessened by increasing the rate at which the steel passes through the precipitation temperature range. If austinitic-type stainless steel be rapidly cooled from above 1800° F. to below 800° F., its toughness and resistance to corrosion are preserved at their best.

It is among the objects of this invention to provide improved apparatus for effectively controlling the heat gradient during the localized heating of metal by efficiently conducting heat therefrom at a rate proportional to the rate of heat input; to provide an improved apparatus for preventing the conduction of heat into metal members, which are locally heated, beyond a point a minimum distance from the point of heat application; to provide an improved apparatus for preventing shrinking and warping of metal plates during welding operations, and eliminating the necessity for stress relieving after the welding operation, by reducing the development of internal stresses in such plates during the welding operation; and to provide an improved apparatus for producing refined grain structures in welded metals, and for maintaining toughness and corrosion resistance of austenitic-type stainless steel during localized heating thereof.

These and other objects of the invention will in part be obvious and in part become apparent from the following description and the accompanying drawing, in which:

Fig. 1 illustrates a typical embodiment of this invention as it may be used for removing heat during a welding operation; and Figs. 2 and 3 illustrate modifications of the embodiment of the invention shown in Fig. 1.

Generally speaking, the invention utilizes the controlled application of heat absorbing fluid and/or cooling media, such as liquids or gases, directly in contact with a metal body which is being progressively locally heated to an elevated temperature, at a zone immediately adjacent to or coextensive with the zone of heat application, in such a manner that a definite heat gradient is established from the point of heat application to the point of heat withdrawal, and the heat absorbing medium is applied at such rates that the rate of heat removal is approximately proportional and preferably substantially equal to the rate of heat input. By proper application of the heat absorbing medium, with relation to the point of heat application, conduction of heat through the remaining mass of metal is restrained so that the transition zone between the heated and unheated masses of the metal can be maintained only a few thousandths of an inch from the point of heat application. When so applied, there is no heat transmitted outwardly from the point of heat application into the main body of metal, and due to the small mass of the metal which is permitted to attain a high temperature, little opportunity is afforded for the development of strains and stresses, and consequently shrinking and warping are minimized and usually substantially eliminated.

The invention is based upon the principle that heat in a body tends to flow toward the point of lowest temperature. This principle is somewhat analogous to that of the flow of electric current in a conductor, which, as is common knowledge, flows in the conductor from a point of high potential to a point of relatively low potential. Thus, by proper location of the heat absorbing medium, a heat gradient may be established between two points in such zone, which heat gradient is substantially steeper than any heat gradient between points in such zone and points in the remaining mass of metal, and the heat may be caused to flow in a definite path through the heat conductive member. So long as a point of sufficiently low temperature is maintained at a suitable location adjacent to the point of application of heat, all the applied heat will tend to flow directly to the point of application of the absorbing medium rather than through the adjacent masses of the heat conductive member.

The invention takes cognizance of the fact that water, while a good absorber of heat, in that it has a high specific heat, is not a good conductor thereof. The transfer of heat through water depends largely upon convection and stirring. The heat from a heated body is absorbed by the film of water immediately adjacent the heated body but is transmitted only slowly from this film to adjacent films or layers of water. In order to provide effective heat withdrawal it is necessary that the water be circulated in order that currents may be set up therein and new films of water brought into contact with the heated surface.

As the heat absorbing medium is circulated in direct contact with the heated members, there is no air film between the members and the medium. The efficiency of heat absorption is thereby enhanced a substantial amount, both by the absence of the air film and by the circulation of the heat absorbing medium. The medium may be either water, gas, refrigerant, or any other fluid, dependent upon the particular heat requirements of the particular application. To prevent the heat absorbing medium remaining in crevices or cracks in the metal, if a fluid such as water is used, the circulating system may be dried by a suitable gas or by a vacuum, when the heating operation is completed.

Welding apparatus embodying the present invention includes a welding fixture for use in welding at least one upper metal member to a lower metal member underlying such member along the line or zone of application of welding heat and extending beyond both sides of said line or zone. The improved welding fixture comprises an imperforate, unitary or one-piece gasket of yieldable material constructed and arranged to engage spaced parallel portions of the under surface of the lower metal member and to cooperate therewith to form a single fluid-tight channel directly beneath and bridging the line or zone of welding heat application, such fluid-tight channel being constructed and arranged for circulating therethrough a heat absorbing medium under pressure along a portion of said under surface directly opposite and coextensive with said line. The gasket is carried by a rigid support which is constructed and arranged to tightly hold the gasket against said spaced parallel portions of said under surface of the lower metal member. The support has a top face which engages and supports the bottom face of the gasket across its entire width and presses the parallel marginal portions of the gasket fluid-tightly against the spaced portions of the under surface of the lower metal member. Thus, a portion of the yieldable gasket provides the entire bottom wall of the fluid-tight channel and is completely sustained against bulging or failure by the rigid support. The improved welding apparatus also includes, in combination with the welding fixture, clamps which are respectively constructed and arranged to engage and bear against the upper surface or surfaces of the upper metal member or members at points spaced substantially equal distances from the line of welding heat application and operate to hold the metal members in welding position relatively to said fixture and the gasket thereof. These clamps are spaced apart sufficiently to leave room between them for applying welding heat to the upper metal member or members along the line or zone of welding heat application.

Referring to Fig. 1 of the drawing, a pair of relatively thin sheets or plates P, of considerable area, are illustrated with their adjacent edges in juxtaposition to form a welding seam and in position to be weld united to a similar sheet or plate P' by a weld W. The lower metal member or sheet P' underlies the upper metal members or sheets P along the line W of welding heat application and extends laterally on both sides of said line. The sheet P' is supported upon a special heat absorbing fixture F, and the sheets P are disposed on sheet P' with their adjacent edges in substantially abutting relation. Clamps C cooperate with the fixture F to hold the work in position for welding. The clamps C constitute spaced apart abutments bearing against the upper surfaces of sheets P and positioning the latter relatively to the sheet P'. The clamps C are spaced substantially equal distances from the edges and portions to be weld united, so as to leave room between the clamps for applying welding heat to and along said edges and portions.

Fixture F comprises a support such as an anvil or bracket 10 to which is secured a gasket member 12 having a wide, extremely shallow longitudinal recess 14 formed in its upper surface. In cooperation with the spaced clamps C, the support 10 presses the upper marginal surfaces of the gasket 12 on each side of the recess 14, against spaced parallel portions of the under surface of the sheet P', to form with the latter a single fluid-tight channel directly beneath and bridging the line W of welding heat application. A suitable heat absorbing medium, desirably at a sub-atmospheric temperature, is circulated under pressure through longitudinal recess 14 to absorb heat from the work at point S. Due to the shape of longitudinal recess 14, the heat absorbing medium is in the form of a thin film, as only the layer of absorbing medium contacting plate P' will absorb heat, and thus a great depth of heat absorbing medium is unessential and inefficient. The effective cooling procedure is to circulate the medium against plate P' under pressure so that a new film of the medium is constantly coming in contact with the plate.

Under the conditions illustrated, the portions of the work at the weld W are at a relatively high temperature, while at points A near the extremities of the work, the sheets or plates are at substantially normal atmospheric temperature. If no heat absorbing medium were applied adjacent point S, the heat gradient in the members P, P' would extend from the weld W to points A and heat would flow from the weld to points A in proportion to the difference between the respective temperatures at these points. It will be apparent that the work would thus be heated to varying temperatures throughout substantially all the distance between weld W and points A. Consequently, stresses would be set up within these limits resulting in warping of the sheets upon subsequent cooling thereof.

However, when the proper heat absorbing medium at the proper sub-atmospheric temperature is circulated through the narrow longitudinally extending zone comprising channel 14, the arrangement of Fig. 1 is highly efficient. As the point S is at sub-atmospheric temperature, the heat passes directly through the work from weld W to point S where it is absorbed by the heat absorbing medium along a single line within the heated zone. No heat flows outwardly through the plates toward points A. As an example of the efficiency of heat absorption, it should be noted that pure India rubber, which softens at about 260° F., may be used for member 12, although the welding temperature immediately adjacent thereto may be in excess of 2700° F., as the heat is all absorbed before it reaches the parts of member 12 contacting plate P'. It should be understood, however, that the member 12 may be formed of any suitable material such as fibre, copper, or steel, and need not be formed of rubber.

Fig. 2 illustrates the application of the invention to the weld uniting of at least one upper metal member to a lower metal member underlying the upper member along the line of application of welding heat and extending beyond both sides of said line, and which may form a completely or partially closed channel or conduit. Thus, in the arrangement of Fig. 2, sheets or plates P are to be weld united to the web 22 of a U-shaped channel U, against which they are positioned by clamps C. The open side of the channel is closed by a bracket 24, supporting a suitable gasket 26 engaging the channel flanges 28. In cooperation with the spaced clamps C, the support 24 presses the upper marginal surfaces of the gasket 26 against the under surface of the spaced parallel channel flanges 28, to form with the latter a single fluid-tight channel directly beneath and bridging the line W of welding heat application. Heat flows through weld W to point S where it is absorbed rapidly by a heat absorbing medium circulated under pressure through the conduit formed by channel U and gasket 26. No heat flows through the sheets to points A in the arrangement of Fig. 2.

Fig. 3 illustrates the application of the invention to the formation of angular or corner welds. In Fig. 3, at least one upper metal member, such as a pair of sheets or structural members P, which are to be weld united to a lower metal member comprising angle E by a weld W extending along the corner of the angle E, are arranged in overlapping relation with the outer surface of the legs of the angle and with their edges in adjacent relation. The angle E underlies the upper metal member along the line W of application of welding heat and extends on both sides of said line. A special fixture F' is used as part of the cooling medium conduit and work supporting means and, during welding, cooperates with the spaced clamps C to hold the metal members in welding position, the room between the clamps being sufficient for applying the welding heat to and along the corner of the assembly to produce the weld W. This fixture comprises a bracket 34 and a gasket 36 having perpendicularly related opposed longitudinal bevelled edges 38 which are pressed by the support 34 in fluid-tight engagement with the under surfaces respectively of the legs of the angle E, constituting spaced parallel portions of the lower of the members to be weld united, thereby forming, in conjunction with the interior surface of angle E, a single fluid-tight triangular channel or conduit 40 for the heat absorbing medium. The medium circulated under pressure through channel 40 directly beneath and bridging the line of welding heat application, absorbs heat at point S, establishing thereby a single steep heat gradient through weld W. No heat flows through the members P or E to the points A.

From the foregoing description, it will be apparent that the invention is based upon the laws of heat flow. By establishing a point at relatively low temperature immediately adjacent the welding zone, a steep heat gradient is provided causing applied heat units to flow to this point and preventing flow of heat outwardly through the metallic members. Furthermore, the high heat absorbing properties of water or other heat absorbing media are used effectively, while the low heat conductivity of such media is overcome by using shallow films or strata of the media circulating under pressure in contact with the work at the welding point. Warping is prevented as there is substantially no heating of metal beyond a point a few thousandths of an inch from the welding zone, and due to the rapid absorption of heat by the heat absorbing media.

As distinguished from prior apparatus, in which a heat absorbing medium has been applied to the work at points spaced a substantial distance from the zone of heat application, the present invention resides in the application of the medium at sub-atmospheric temperature in a thin film under pressure at a single point, line, zone or confined path directly opposite and coextensive with the point, line, or zone of heat application. There is thus established a single, steep heat gradient through the heated zone, and no heat flows outwardly therefrom through the work. On the other hand, in such prior apparatus, heat gradients are established through substantial portions of the work, resulting in warping thereof.

Additionally, when the invention is applied to the welding of stainless steel, loss of the protecting chromium from the grains is prevented due to the extremely rapid rate at which heat is withdrawn from the metal and due to the very narrow heat affected zone.

While certain embodiments of the invention have been illustrated and described in order to furnish a clear understanding of the principles involved, it will be obvious to those skilled in the art that the invention may be otherwise embodied and practiced without departing from the principles or exceeding the scope of the invention.

This application is a division of our copending application Serial No. 321,620, filed March 1, 1940, now Patent No. 2,280,150, issued April 21, 1942.

What is claimed is:

1. Welding apparatus for use in welding at least one upper metal member to a lower metal member underlying such upper member along the line of application of welding heat and extending beyond both sides of said line, said apparatus comprising, in combination, an imperforate unitary gasket of yieldable material constructed and arranged to engage spaced parallel portions of the under surface of such lower member and to cooperate therewith to form a single fluid-tight channel directly beneath and bridging such line of welding heat application, a portion of said gasket providing the entire bottom wall of said channel, said fluid-tight channel being constructed and arranged for circulating therethrough a heat absorbing medium under pressure along a portion of said under surface directly opposite and coextensive with said line; a support for said gasket constructed and arranged to hold said gasket fluid-tightly against said spaced parallel portions of said under surface; and clamps spaced apart and respectively constructed and arranged to engage the upper surface of such upper metal member at points spaced from said line, to hold such metal members in welding position relatively to said gasket and support and to leave room between said clamps for applying welding heat to such upper metal member along such line of welding heat application.

2. Welding apparatus as claimed in claim 1, wherein said imperforate unitary gasket consists entirely of rubber which softens at about 260° F.

3. Welding apparatus as claimed in claim 1, wherein said imperforate unitary gasket has a shallow longitudinally extending recess in its upper surface and upper marginal portions adjoining and coextensive with said recess, such marginal portions being constructed and arranged to engage the under surface of such lower member and to cooperate with the latter and said recess to form such single fluid-tight channel directly beneath and bridging the line of welding heat application, said support being constructed and arranged to cooperate with said clamps and hold said marginal portions of said gasket fluid-tightly against said under surface.

4. Welding apparatus for use in welding at least one upper metal member to the web of a lower metal channel member underlying and contacting such upper member along the line of application of welding heat and having depending flanges spaced from both sides of said line, said apparatus comprising, in combination, an imperforate unitary gasket of yieldable material adapted to engage the flanges of such lower channel member and to cooperate with such flanges to form a single fluid-tight conduit directly beneath and bridging such line of welding heat application, a portion of said gasket providing the entire bottom wall of said conduit, said fluid-tight conduit being constructed and arranged for circulating therethrough a heat absorbing medium under pressure along a portion of the under surface of said channel web directly opposite and coextensive with said line; a support for said gasket constructed and arranged to tightly hold marginal portions of said gasket against the flanges of said channel member; and clamps spaced apart and respectively constructed and arranged to engage the upper surface of such upper metal member at points spaced substantially equal distances from said line, to hold such metal members in welding position relatively to said gasket and said support and to leave room between said clamps for applying welding heat to said upper metal member along said line.

5. Welding apparatus for use in welding at least one upper metal member to a lower metal angle member underlying such upper member along the line of application of welding heat and having legs respectively extending laterally beyond both sides of said line, said apparatus comprising, in combination, an imperforate unitary gasket of yieldable material having bevelled marginal surfaces respectively constructed and arranged to engage the under surface of each leg of such angle member and to cooperate with such legs to form a single fluid-tight channel of triangular cross-section directly adjoining and bridging such line of welding heat application, a portion of said gasket providing the entire bottom wall of said channel, said fluid-tight channel being constructed and arranged for circulating therethrough a heat absorbing medium under pressure along a portion of the interior surface of said angle member directly opposite and coextensive with said line; a support for said imperforate unitary gasket constructed and arranged to hold the bevelled marginal surfaces of said gasket fluid-tightly against the legs of said angle member; and clamps spaced apart and respectively constructed and arranged to engage the upper surface of such upper metal member at points laterally spaced from said line of welding heat application, to hold such members in welding position relatively to said gasket and said support and to leave room between said clamps for applying welding heat to said upper member along said line.

6. Welding apparatus for use in welding at least one upper metal member to a lower metal member underlying such upper member along the line of application of welding heat and adjacent both sides of said line, said apparatus comprising, in combination, an imperforate unitary gasket consisting entirely of yieldable material and having marginal portions constructed and arranged to engage spaced parallel portions of the under surface of such lower member and to cooperate with the latter to form a single fluid-tight channel directly beneath and bridging such line of welding heat application, said fluid-tight channel being constructed and arranged for circulating therethrough a heat absorbing medium under pressure along a portion of said under surface directly opposite said line; a rigid support for said yieldable gasket constructed and arranged to engage and support the bottom face of said gasket and to press said marginal portions fluid-tightly against said spaced portions of said under surface, that portion of said yieldable gasket disposed between said marginal portions constituting the entire bottom wall of said fluid-tight channel and being sustained against bulging or failure by said rigid support; and clamps spaced apart and respectively constructed and arranged to bear against the upper surfaces of such upper metal members at points spaced substantially equal distances from said line, to hold such upper and lower metal members in welding position relatively to said gasket and said support and to leave room between said clamps for applying welding heat directly to such upper metal member along said line.

FRANKLIN C. HASSE.
ARTHUR A. BERNARD.